United States Patent [19]

Shimamura et al.

[11] Patent Number: 5,721,586
[45] Date of Patent: Feb. 24, 1998

[54] MOVABLE HALF MIRROR HAVING A MOVABLE PROMPTER FOR TV CAMERA

[75] Inventors: Takashi Shimamura; Nobuo Matsui, both of Omiya, Japan

[73] Assignee: Fuji Photo Optical Co., Ltd., Omiya, Japan

[21] Appl. No.: 555,044

[22] Filed: Nov. 8, 1995

[30] Foreign Application Priority Data

Nov. 8, 1994 [JP] Japan .................................. 6-300227
Nov. 8, 1994 [JP] Japan .................................. 6-300228

[51] Int. Cl.⁶ ...................................................... H04N 7/18
[52] U.S. Cl. ............................ 348/61; 348/722; 348/375; 352/4
[58] Field of Search .............................. 348/207, 61, 375, 348/722, 373; 352/4; 353/28; H04N 5/225

[56] References Cited

U.S. PATENT DOCUMENTS

| | | | |
|---|---|---|---|
| 2,926,559 | 3/1960 | Oppenheimer | 352/4 |
| 4,049,907 | 9/1977 | Damon | 348/722 |
| 4,894,722 | 1/1990 | Suzuki | 348/722 |
| 5,373,333 | 12/1994 | Kawada et al. | 353/122 |
| 5,386,227 | 1/1995 | Zeper | 348/61 |
| 5,555,443 | 9/1996 | Ikehama | 455/12.1 |
| 5,620,245 | 4/1997 | Kobayashi et al. | 353/28 |

*Primary Examiner*—Andrew Faile
*Assistant Examiner*—Tuan V. Ho
*Attorney, Agent, or Firm*—Ronald R. Snider

[57] ABSTRACT

The present invention is a prompter for TV camera allowing it to easily mount a half mirror on a manuscript display with an image memory. The apparatus comprises a support plate swingably supporting the half mirror, operating knobs for securing the half mirror at its operating position and retracted position, and a light shield for shielding the half mirror therearound when the half mirror is positioned in front of the lens assembly, and being foldable. The support plate is mounted on the display unit by mating the half hinges, or by coupling with magnets. When the half mirror is inclined by 45° to its operating position, the image of manuscript is displayed on the half mirror. In retracting, the half mirror is moved to the retracted position and the light shield can be folded.

9 Claims, 8 Drawing Sheets

MOVABLE HALF MIRROR HAVING A MOVABLE PROMPTER FOR TV CAMERA

BACKGROUND OF THE INVENTION

This application claims the priority of Japanese Patent Applications Nos. 6-300227 and 6-300228 filed on Nov. 8th, 1995.

FIELD OF THE INVENTION

The present invention particularly relates to an arrangement of a prompter applicable to a broadcasting or industrial TV camera or the like carried in various shooting sites.

DESCRIPTION OF THE PRIOR ART

Figure 14:
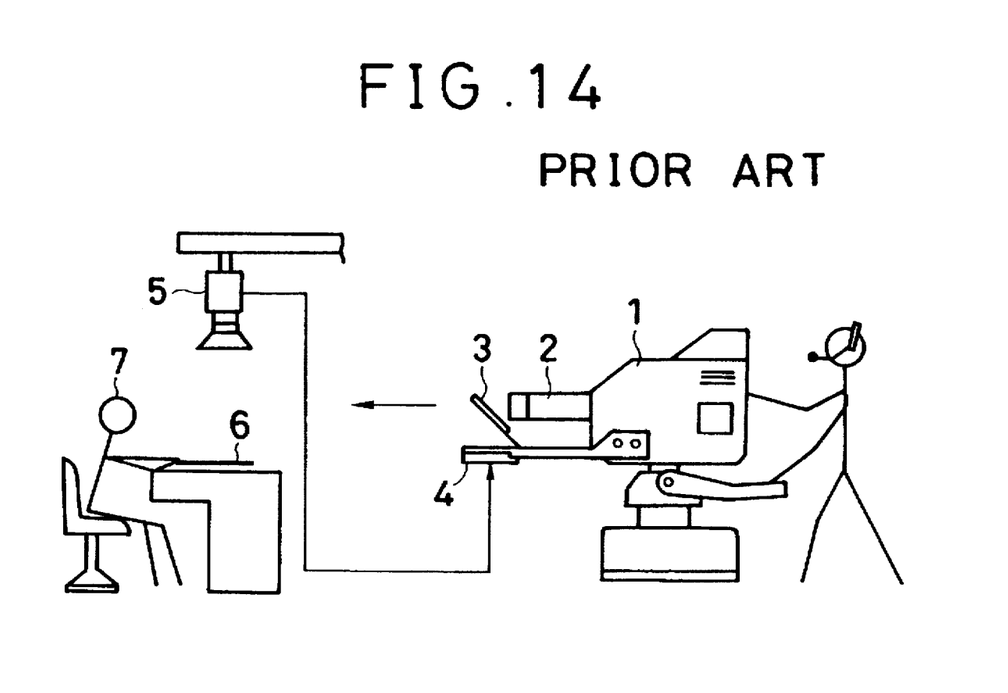
FIG. 14 is a conventional prompter when it is used.

A prompter is a device for presenting a manuscript such as a news manuscript, speech, comment necessary for a newscaster, master of ceremony, or performer to such person. An example of such device is shown in FIG. 14. In the figure, a half mirror 3 is disposed in front of a lens assembly 2 of a TV camera 1. Mounted under the half mirror 3 is a transmissive liquid crystal display plate 4 on which an image of the manuscript 6 taken by a video camera 5 is arranged to be displayed. Accordingly, the image displayed on the liquid crystal display plate 4 is projected on the half mirror 3.

Such prompter enables the newscaster 7 to read the manuscript projected on the half mirror 3 in front of the lens assembly 2 so that he or she can provide comments on the news. At the same time, the newscaster 7 is being shot by the lens assembly 2 through the half mirror 3, whereby the newscaster 7 can always direct his or her gaze directly to the lens assembly 2.

BRIEF SUMMARY OF THE INVENTION

The above-mentioned prompter has a problem such that, since it uses the half mirror 3, the liquid crystal display plate 4 and the video camera 5 to take and project the manuscript on the half mirror 3, equipment including such component is difficult to be carried when shooting is conducted by taking the TV camera 1 outdoor so that shooting is inconvenient at a location other than a studio.

Figure 8A:
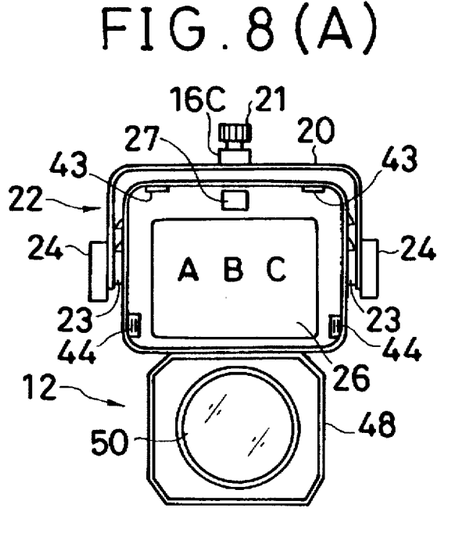
FIG. 8A is a front view showing the lens assembly and the display unit with the half-mirror attachment removed in the embodiment.
Figure 8B:
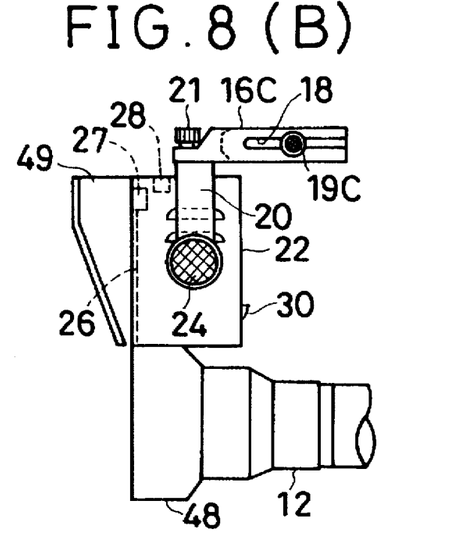
FIG. 8B is a side view of FIG. 8A.

In view of the above, the applicant has proposed apparatus in which a display unit with image memory can be disposed near the outer periphery of the lens assembly 2 (on the upper or lower side), image information of the manuscript captured by the lens assembly 2 being stored in the memory, the image of manuscript being displayed on the display unit when required (FIG. 8 to be described later). This apparatus does not require the half mirror 3, the video camera 5 and the like so that it can be easily carried and the prompter may be used even when the TV camera 1 is supported on the shoulder.

However, it may be desirable to employ an arrangement in which the half mirror 3 is disposed in front of the lens assembly 2 as shown in FIG. 14 in a case where shooting is conducted in a studio for newscast by using the prompter. That is, when the half mirror 3 is used, there is provided an advantage that the gaze of the person to be shot can be perfectly match the optical axis of the lens assembly 2. There are many cases where shooting is requested with such arrangement.

The present invention is made in view of the above problems and intended to provide for a display with an image memory a half-mirror attachment for a prompter which allow to mount the half mirror for matching the gaze of the person to be shot with the optical axis of the lens assembly.

To attain the above object, the apparatus according to the present invention includes a display unit for displaying an image of manuscript and disposed in the vicinity of a camera lens assembly, and a half-mirror attachment disposed at the display side of the display unit, wherein the half-mirror attachment comprises a half mirror in front of the camera lens assembly for reflecting the image on the display unit toward a person to be shot, a support plate for rotatably holding the half mirror, a rotatable operating member for securing the half mirror at an operational position and a retracted position by rotating the half mirror, and a light shield foldably mounted on the support plate for shielding the half mirror and the camera lens assembly around and in front of them.

The display unit may comprise a memory for retracting the manuscript.

With such arrangement, the manuscript display unit is disposed, for example, above and in front of the camera lens assembly and facing downward. The support plate is directly mounted under the display unit with single action by a half hinge member of a magnet. The light shield mounted on the support plate is made of synthetic leather or the like, and extended into a bag like shape to the rear end of which the front end of the lens assembly is attached. When the half mirror is secured with an inclination of about 45° (operating position) by operating the rotatable operating member, the half mirror is set on the optical axis of the lens assembly. When the shooting completes, the light shield can be folded by dismounting the support plate from the display unit and returning the half mirror back to a position parallel to the support plate (retracted position) so that the attachment can be retracted in a compact manner.

In addition, the present invention further comprises image reversing means for displaying the mirror image of the manuscript on the display unit when the half-mirror attachment is in use. With such arrangement, a mirror image of the manuscript which is an image inverted upside down here is displayed. Then, the manuscript is displayed in a normal state on the half mirror, whereby the person to be shot is enabled it to read the manuscript on the half mirror which matching his or her gaze with the optical axis of the lens assembly.

Furthermore, the present invention further comprises a rotation axis as the support for the display unit and provided on each side of the display unit for rotating the display plane of the display unit toward the lens assembly, a holder frame formed in a shape corresponding to the outer surface of the display unit pivotally supporting the rotation shaft for rotation of 360°, and a support arm for separably supporting the holder frame.

With such arrangement, the rectangular display unit is held in such a manner that it is pivotablly supported at each end with, for example, a U-shaped holder frame, and suspended from the holder frame. Such holder frame and the display unit can be removed from the support arm so that the display unit in a state where it is separated from the TV camera can be placed on, for example, a desk of a newscaster or master of ceremony. In this case, there is an advantage that the holder frame may be used as the stand for the display unit by rotating downward.

DESCRIPTION OF THE PREFERRED EMBODIMENTS

First Embodiment

Figure 5:
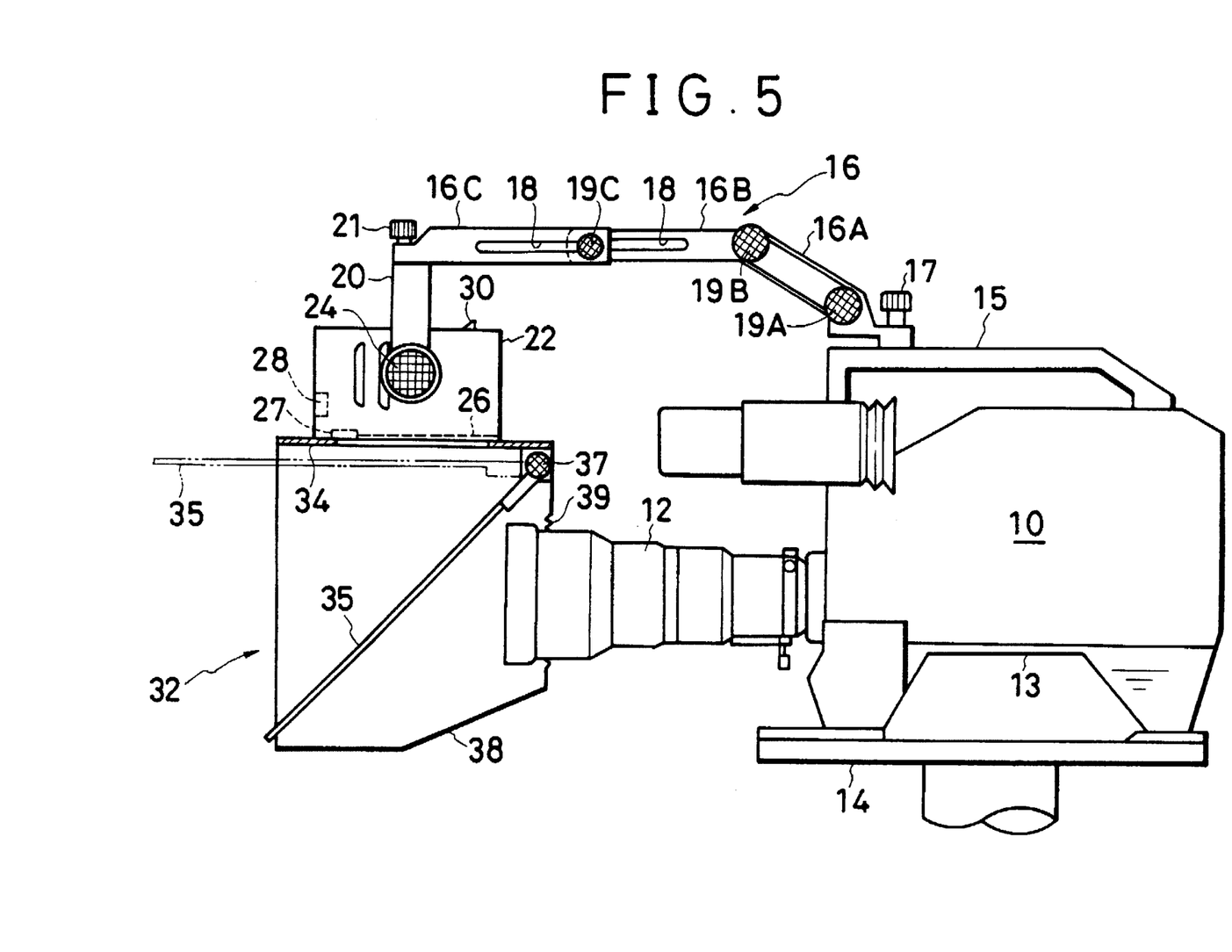
FIG. 5 is a side view showing the half-mirror attachment of the first embodiment when it is mounted on a TV camera.
Figure 6:
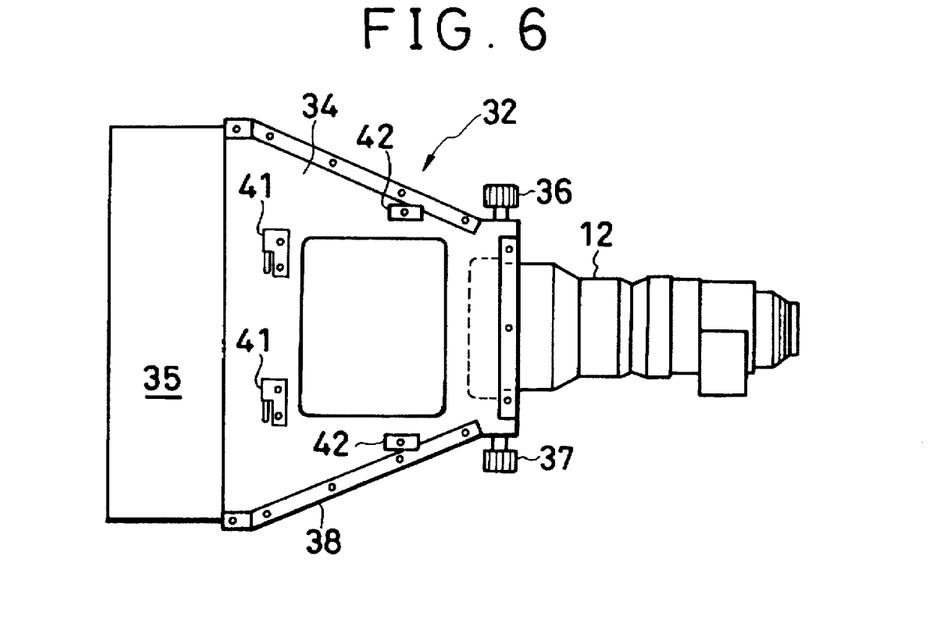
FIG. 6 is a top view of the half-mirror attachment with the half mirror in the retracted position of FIG. 5.
Figure 7:
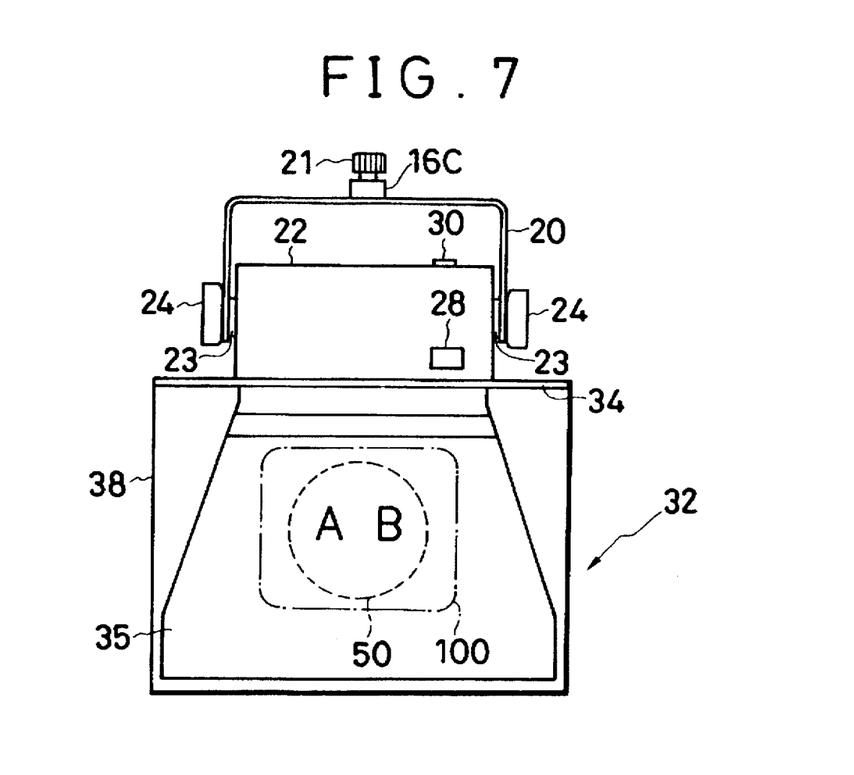
FIG. 7 is a front view of the region around the half-mirror attachment of FIG. 5.
Figure 9:
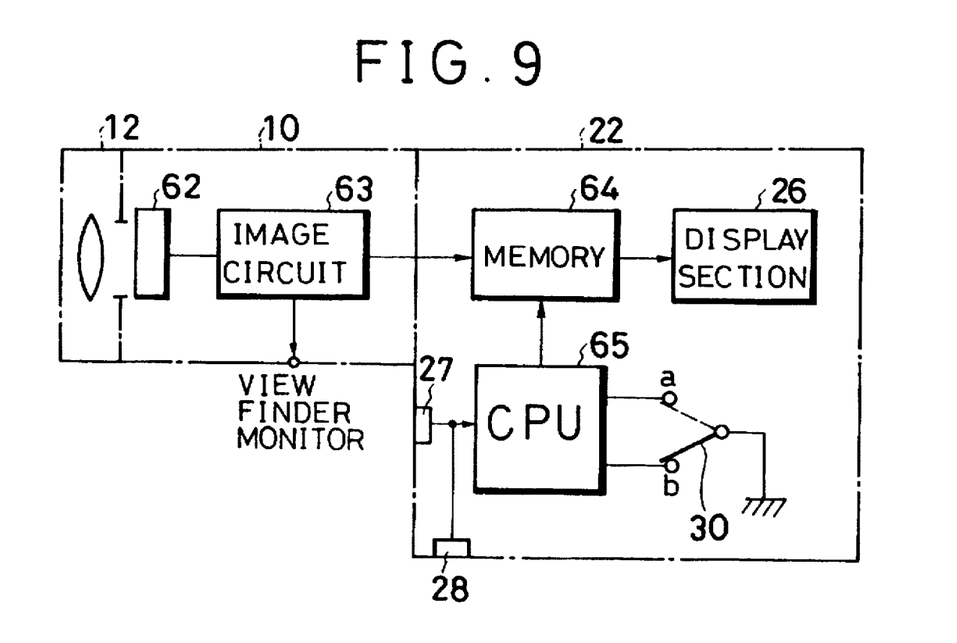
FIG. 9 is a block diagram showing major circuit configuration in the embodiment.

FIGS. 1-4 show the arrangement of a half-mirror attachment for prompter according to a first embodiment. FIGS. 5-7 show a state where the half-mirror attachment is mounted on a TV camera. FIG. 8 shows the prompter in use without the half-mirror attachment, and FIG. 9 shows a circuit configuration. First, the overall arrangement of the TV camera will be explained by referring to FIGS. 5 and 8. Referring to FIG. 5, a camera body 10 has a lens assembly 12, and formed with a concave shoulder mount 13 on its underside which can be used for carrying the camera body 10 in the case of relay from the spot or the like. However, it is assumed here to use the camera in a studio. Thus, the camera body 10 is fixed on a support stand 14. The camera body 10 also has a grip 15 on its topside.

A support arm 16 is secured on the grip 15 with a mounting screw 17, and comprises, as shown in the figure, swing arms 16A and 16B, and a slidable arm 16C. Guide grooves 18 are formed in the arms 16B and 16C. Fixing screws 19A, 19B, and 19C are located at the connections of arms 16A, 16B, and 16C. A U-shaped holder frame 20 is secured on the front end of the arm 16C with a mounting screw 21, and holds a display unit 22. In other words, the holder frame 20 pivotably support a shaft 23 on each side of the display unit 22, as shown in FIG. 7, allowing rotation in 360°. The display unit 22 is secured at any position by a securing screw 24 provided on the shaft 23.

The display unit 22 has, as shown in FIG. 8 (A), a display section 26 consisting of a liquid crystal display panel or the like for displaying a manuscript. Mounted above the display section 26 is an infrared sensor 27 for receiving an infrared beam from a remote control unit. In addition, as shown in FIG. 5, a similar infrared sensor 28 is provided on the top of the display unit 22 for assisting receiving of an infrared beam from the remote control when the half-mirror attachment is in use. Outputs of these infrared sensors 27 and 28 are input to an internal CPU or the like, whereby pages of the manuscript are turned by the remote control. On the back of the display unit 22 also has a change-over switch 30 for converting an image into a mirror image when the half mirror is in use.

FIG. 9 shows a configuration of electric circuits in the lens assembly 10 and the display unit 22. The circuits in FIG. 9 perform display of the image of manuscript and inversion of it. That is, as shown in FIG. 9, the camera body 10 has a charge coupled device (CCD) 62 for receiving image light from the lens assembly 12 in the rear state of which an image circuit 63 is provided for performing predetermined signal processing to obtain an image signal. The image signal generated by the image circuit 63 is output to a view finder and a monitor, and to the display unit 22.

In addition, an image memory 64 and a CPU 65 are provided in the display unit 22. The image memory 64 can store the output from the image circuit 63 under the control of the CPU 65. Accordingly, when shooting and recording of the manuscript are started by operating an operation switch (not shown) on the display unit 22, the image of manuscript is taken from the image circuit 63 to the image memory 64 so that it can be displayed on the display section 26, as required. The image memory 64 can also store manuscript information from a personal computer or the like. Moreover, a video input terminal is provided on the display unit 22, although it is not shown in the drawings, to receive an image signal from the videocamera 5 shown in FIG. 14 so that any manuscript other than those stored in the image memory 64 can be displayed on the display unit 22.

The CPU 65 performs operations such as turning of pages of the manuscript based on an image control signal input from the infrared sensors 27 and 28, and inverts the image based on an output of the change-over switch 30. That is, when the change-over switch 30 is on a terminal a, the CPU 65 displays the manuscript image in a normal state on the display section 26, while, when it is changed over to a terminal b, the CPU 65 performs an operation for displaying a mirror image of the manuscript. In the embodiment, when it reads and controls the image in the image memory 64 to invert the image upside down (sometimes, the image being inverted right to left).

Figure 1:
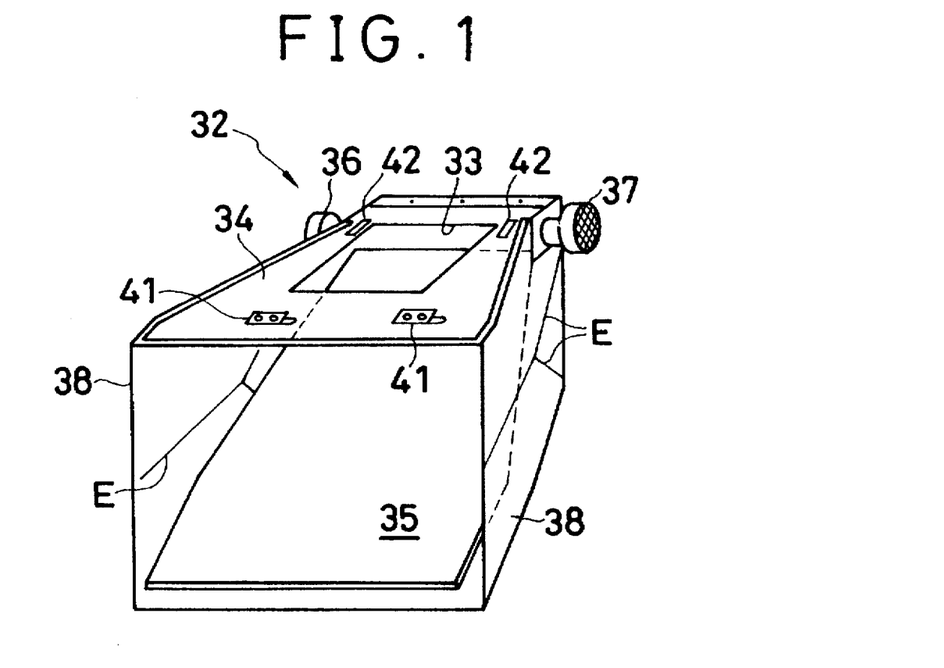
FIG. 1 is a front perspective view of the arrangement of a half-mirror attachment for prompter according to a first embodiment of the present invention.
Figure 2:
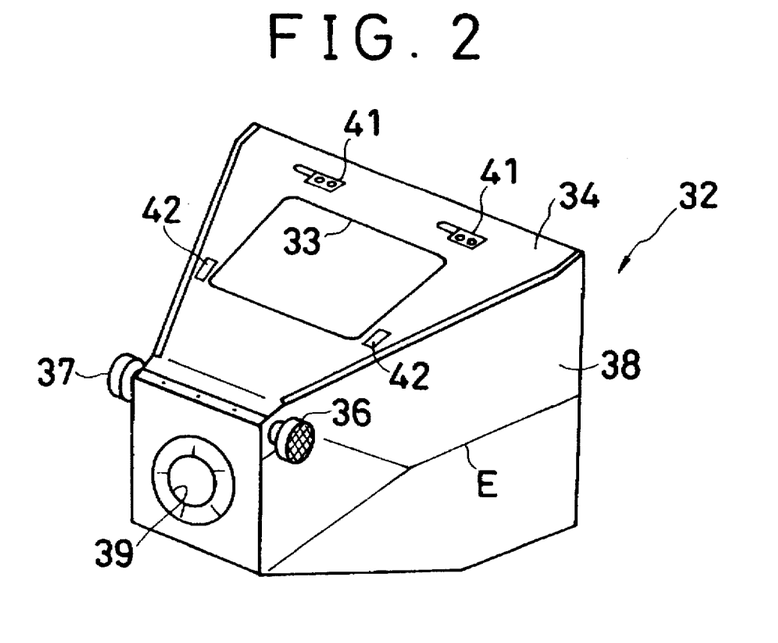
FIG. 2 is a rear perspective view of the half-mirror attachment of the first embodiment.

Then, as shown in FIGS. 5-7, the half-mirror attachment 32 is mounted near the display panel of the display unit 22. The half-mirror attachment 32 has, as shown in FIGS. 1 and 2, a support plate 34 consisting of a metal plate widened toward an end and formed with an opening 33 of a size corresponding to that of the display section 26 of the display unit 22 on which support plate 34 a half mirror 35 is swingably mounted. The half mirror 35 can be swung by operating two operating knobs 36 and 37.

In other words, the half mirror 35 is pivoted on the shaft of two operating knobs 36 and 37 so that it can be swung and secured at a predetermined position by various known mechanisms. For example, one of the operating knobs 36 is used as a securing screw member, while the other operating knob 37 is arranged to be swung together with the half mirror 35. Then, the shaft is provided with a stopper mechanism which locks the half mirror 35 at a retracted position where it is parallel to the support plate 34, and at an operating position where it is inclined by 45°. With such arrangement, after the half mirror 35 is swung to a predetermined position by the operating knob 37, it can be locked at the swung position by the operating knob 36.

Alternatively, a ratchet mechanism may be used. Meshing sections of face ratchets can be provided between the shafts of the operating knobs 36 and 37 (only one may be acceptable), and the shaft of the support plate 34. With such arrangement, the ratchets are disengaged by pulling the operating knobs 36 and 37 outward, and then, the half mirror 35 can be swung to a predetermined position by rotating the operating knobs 36 and 37. When the operating knobs 36 and 37 are pushed inward at that position, the ratchets are meshed so that the half mirror 35 can be locked. Furthermore, a stopper mechanism may be employed in which balls or pins energized by springs engage in engaging grooves at the retracted position and the operating position inclined by 45° of the half mirror 35. Various mechanisms may be applied as the mechanism for swinging and locking the half mirror 35.

The support plate 34 is a light shield 38 which encloses the entire half mirror 35 except for at its front. The light shield 38 is made of synthetic leather or the like, and mounted on the top of the support plate 34 with screws or the like. Its side has a folding line E as shown for easily folding the light shield toward the support plate 34. Then, as shown in FIG. 2, the rear of the light shield 38 is formed with a hole 39 into which the end of the lens assembly 12 is inserted. The hole 39 is expandably formed by rubber or the like, and its outer periphery is made of cotton velvet or the like.

Figure 3A:
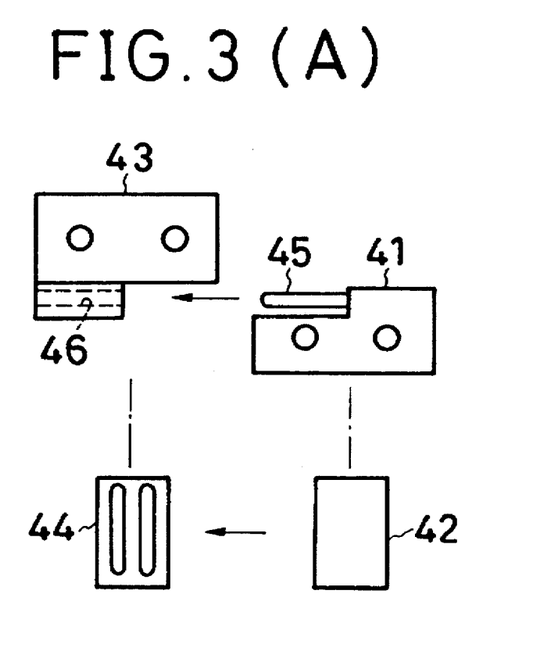
FIG. 3A is a view of mounting members for the half-mirror attachment of the first embodiment before assembly.
Figure 3B:
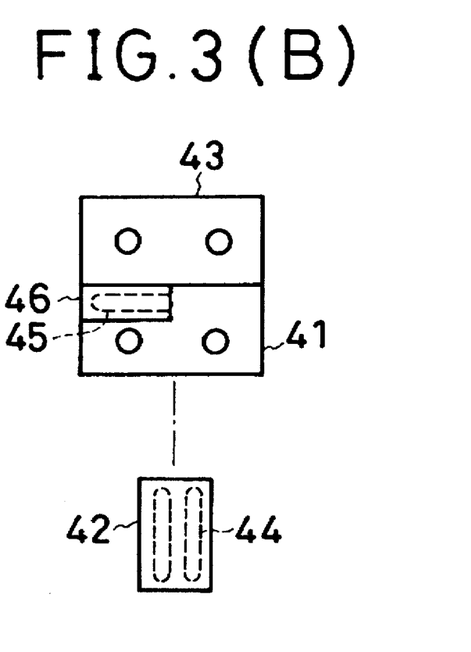
FIG. 3B is a view of the mounting members shown in FIG. 3A after assembly.

In addition, in the first embodiment, disposed on the top surface of the support plate 34 are each two pieces of half hinges 41 and small metal plates 42 as mounting members for the attachment 32. On the other hand, as shown in FIG. 8 (A), two half hinges 43 mating the half hinges 41 are provided inside the top of the display unit 22, and two magnets 44 are mounted inside at its lower sides. That is, as shown in FIG. 3 (A), the half hinge 41 has a shaft 45, while a bearing 46 mating with the shaft 45 is provided in the half hinge 43. Thus, as shown in FIG. 3 (B), when the shaft 45 mates the bearing 46, the half hinges 41 and 43 are coupled, and the magnets 44 attach the metal plates 42 so that the half-mirror attachment 32 is mounted on the display unit 22.

The operation of the first embodiment with such arrangement will be explained in the following. First, FIG. 8 shows the state when the half-mirror attachment 32 is not installed. Here, a lens hood 48 is mounted on the front end of the lens assembly 12, and a hood 49 is mounted in front of the display unit 22. In this case, the display unit 22 is disposed just above the camera lens 50 of the lens assembly 12 so that the manuscript displayed on the display section 26 can be read. Such device is effectively used in relay from the spot or shooting in outdoor.

On the other hand, when the half-mirror attachment 32 is installed, as shown in FIGS. 5–7, the lens hood 48 and the hood 49 are first removed, and the display unit 22 is rotated by 90° so that the display panel 26 of the display unit 22 faces downward. In addition, the arms 16B and 16C of the support arm 16 are extended to move the display unit 22 forward from lens assembly 12. Then, the half-mirror attachment 32 is mounted on the display unit 22 in the state as shown by mating the two half hinges 41 on the support plate 34 with the half hinges 43 on the display unit 22 and attaching the metal plates 42 on the magnets 44. At that moment, the light shield 38 is extended downward like a bag, and set by inserting the front end of the lens assembly 12 into the hole 39 at the rear. Furthermore, the half mirror 35 is completely set by rotating and securing the half mirror 35 with inclination of 45° by operating the operating knobs 36 and 37.

FIG. 7 shows a front view of the display unit 22 and the half-mirror attachment 32, in which a projected image 100 on the display section 26 is displayed on the half mirror 35 overlapping the camera lens 50 of the lens assembly 12 so that the manuscript displayed as the projected image 100 can be read. That is, the mirror image of the manuscript (an upside down image in this case) is read from the image memory and displayed on the display section 26 based on the change-over operation of the change-over switch 30 of the display unit 22. Then, the image displayed on the display section 26 is inverted by the half mirror 37 so that a normal manuscript is recognized by the person to be shot. The prompter with such arrangement is effectively used when the camera body 10 is mounted on a stand 14 in a studio.

Figure 4:
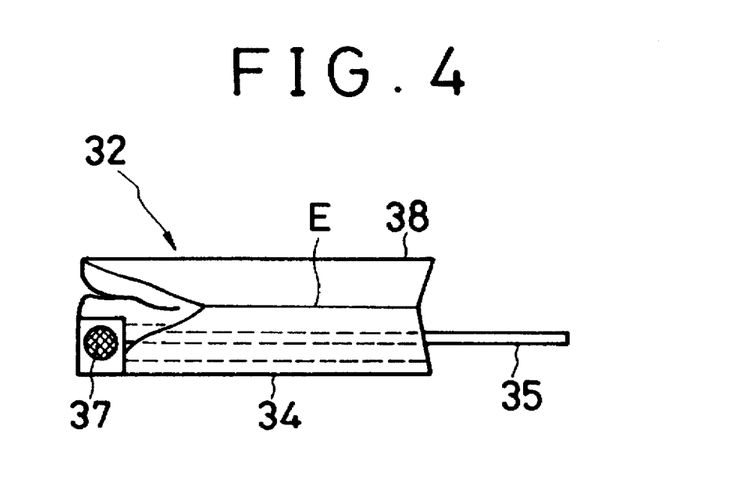
FIG. 4 is a view showing the half-mirror attachment of the first embodiment when it is folded and retracted.

Then, as shown in FIG. 4, after completion of shooting, the prompter can be compactly stored by dismounting the half-mirror attachment 32 from the display unit 22, moving the half mirror 35 to the retracted position parallel to the support plate 34, and folding the light shield 38. Such half-mirror attachment 32 has advantages such that the prompter can be conveniently stored and kept, and can be easily carried.

The half-mirror attachment 32 may be mounted by additionally (or independently) using a fixture which hooks pawl members on engaging pins other than the mounting means such as the half hinges 41 and 43. Other mounting means allowing single action mounting may be employed.

Second Embodiment

Figure 10:
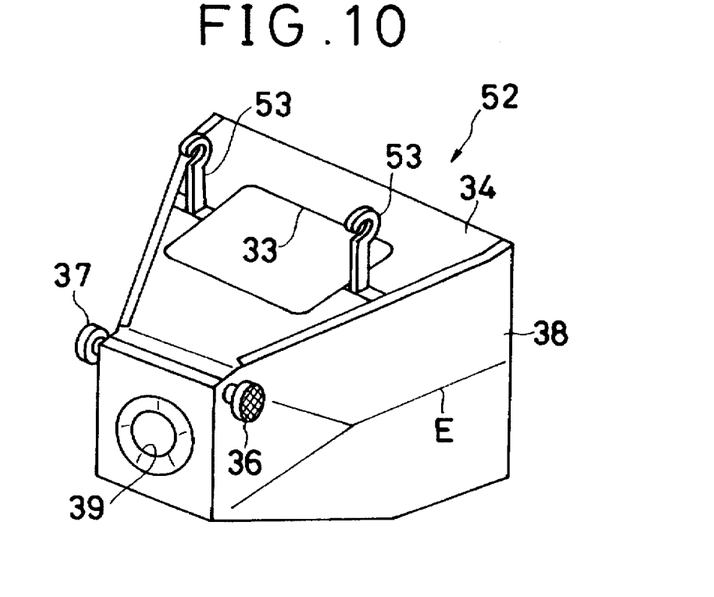
FIG. 10 is a perspective view showing the arrangement of a half-mirror attachment of a second embodiment.
Figure 11:
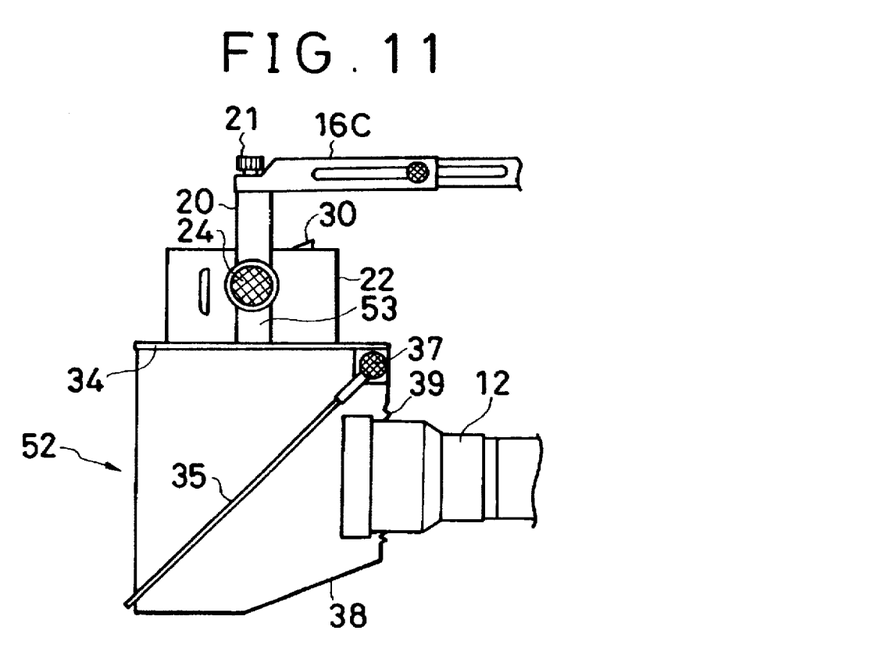
FIG. 11 is a side view showing the second half-mirror attachment mounted on the TV camera.
Figure 12:
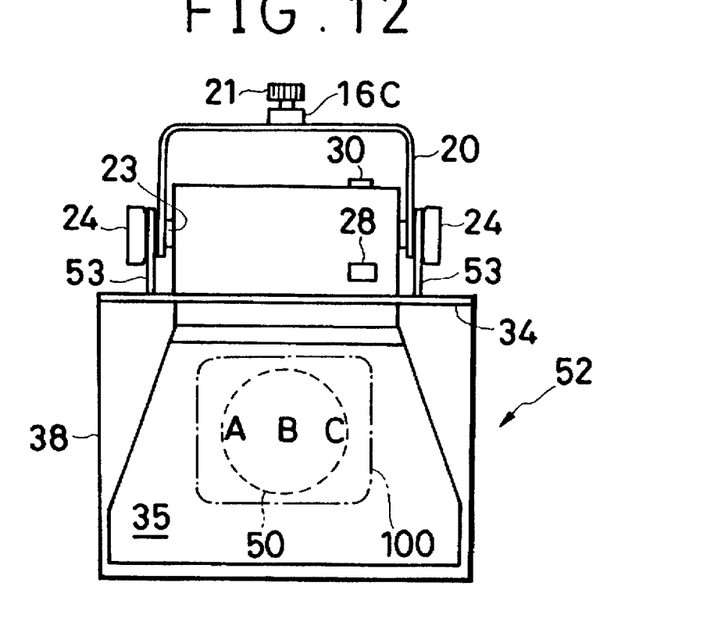
FIG. 12 is a front view of the region around the half-mirror attachment of FIG. 10.

FIGS. 10–12 show the arrangement of a second embodiment. This second embodiment has two mounting fixtures 53 on each side of the opening 33 in the support plate 34 of the half-mirror attachment 52 as shown in FIG. 10 instead of the half hinges 41 and the metal plates 42 of the first embodiment. Other arrangement is similar to that of the first embodiment. The mounting fixture 53 is shaped into a hook at its free end which engages the shaft 23 for holding the display unit 22. The mounting fixture 53 may be constructed to be foldable toward the support plate 34.

FIGS. 11 and 12 show a state where the half-mirror attachment 52 of the second embodiment is installed. As shown in FIG. 12, the attachment 52 can be installed by positioning the hooked end of the mounting fixture 53 together with the holder frame 20 on the shaft 23 provided on the display unit 22, and tightening them with securing screws 24.

In addition, the half-mirror attachment (32, 52) may be directly connected to the arms 16A, 16B and 16C, or to the lens assembly 12 or the camera body 10. In such case, mounting means for applicable component is sufficient to be provided on the attachment.

Although, in the above embodiments, the light shield 38 is formed by synthetic leather, any material such as fabric or rigid material including an acryl plate may by used for the light shield 38 as long as it is foldable. In addition, for the above embodiments, although the display unit 22 is mounted above the lens assembly 12, it may be mounted on the lower section, or either side of the lens assembly 12. In such case, the half-mirror attachment 32 can be positioned at a predetermined position on the display unit 22 by suitably adding frame members to the light shield 38.

As described above, according to the first and second embodiments, a half mirror for matching the gaze of the person to be shot with the optical axis of the lens assembly can be installed on a display unit with an image memory which makes shooting at the site easy. In addition, the attachment has advantages such that it is convenient for storage and keeping because it is compactly folded and retracted, and can be easily carried.

Third Embodiment

Figure 13A:
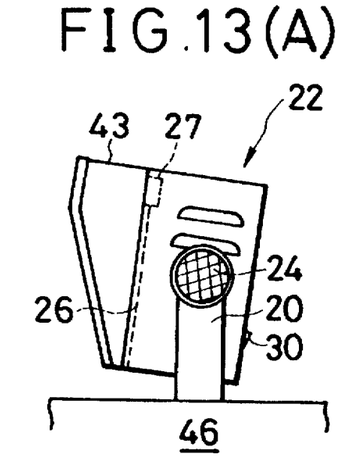
FIG. 13A is a state where the display unit of the embodiment is removed from the TV camera for use.
Figure 13B:
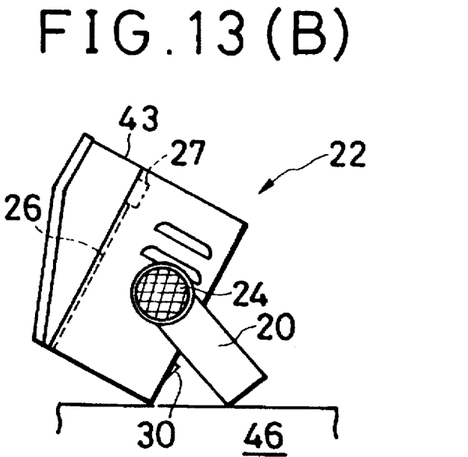
FIG. 13B is a state where the display unit is removed from the TV camera for use.

FIG. 13 shows an arrangement where the display unit 22 is used by dismounting from the support arm 16. In this case, it is dismounted together with the holder frame 20. That is, the holder frame 20 can be removed from the arm 16C by loosening the mounting screw 21 in FIG. 5. Then, as shown in FIG. 13, the display unit 22 is placed on a desk 46 together with the holder frame 20. In this case, therefore, by placing the holder frame 20 underside by rotating by 180°, it can serve as a stand as shown in FIG. 13 (A). In addition, when the display unit 22 is steeply inclined as shown in FIG. 13 (B), the holder frame 20 may be also used as a stand for such inclined display unit 22. While the holder frame 20 in the embodiments has a U-shape, it may a full frame entirely surrounding the display unit 22.

What is claimed is:

1. A prompter for TV camera including a display unit for displaying an image of manuscript and disposed in the vicinity of a camera lens assembly, and a half-mirror attachment disposed in such a manner as to be freely attached or removed at the display side of the display unit, wherein:

the half-mirror attachment comprises, a half mirror in front of the camera lens assembly for reflecting the image on said display unit toward a person to be shot;

a support plate for rotatably holding said half mirror, so that said half mirror is disposed at an operational position and is folded at a retracted position;

a rotatable operating member for securing said half mirror at an operational position and a retracted position by rotating said half mirror; and a light shield which is provided on said support plate for shielding said half mirror and the camera lens assembly around and in front of them and which is mounted to be able to fold when said half mirror is disposed at said retracted position.

2. A prompter for TV camera according to claim 1, wherein said display unit has a memory for storing a manuscript.

3. A prompter for TV camera according to claim 1 further comprising image inverting means for displaying a mirror image of the manuscript on said display unit when said half-mirror attachment is in use.

4. A prompter for TV camera according to claim 1, wherein said display unit is mounted on the camera body by an arm member, the half-mirror attachment being directly mounted on said display unit.

5. A prompter for TV camera according to claim 1, wherein said half-mirror attachment is mounted by an escape mechanism using half hinges.

6. A prompter for TV camera according to claim 1 further comprising a rotation shaft as a support for said display unit provided on each side of said display unit for rotating the display panel of said display unit toward the lens assembly, a holder frame for swingably supporting said rotation shaft and having a shape corresponding to the outer periphery of the display unit for allowing rotation by 360°, and a support arm separably supporting said holder frame.

7. A prompter for a TV camera in accordance with claim 1 wherein said operating position is where said half mirror is located between said lens assembly and said person; and said retracted position is where said half mirror is rotated to a position not between said lens and said person.

8. A prompter for a TV camera in accordance with claim 7 wherein said display unit is rotated to a second operational position when said half mirror is in said retracted position for viewing said display without said half mirror position between said lens assembly and said person.

9. A prompter for a TV camera in accordance with claim 8 further comprising an electronic imaging inverting means for inverting said image when changing between said operational position and said second operational position.

* * * * *